US012674785B2

(12) United States Patent
Dilger et al.

(10) Patent No.: US 12,674,785 B2
(45) Date of Patent: Jul. 7, 2026

(54) DETECTION AND IDENTIFICATION OF CHEMICAL DERIVATIVES FORMED FROM PYROTECHNIC SMOKE REACTIONS

(71) Applicant: The United States of America, as represented by the Secretary of the Navy, Crane, IN (US)

(72) Inventors: Jonathan M. Dilger, Bloomington, IN (US); Benjamin P. Wilkins, Jasper, IN (US); Kelly M. Thoreson, Bloomington, IN (US); Brian C. Bohrer, Evansville, IN (US)

( * ) Notice: Subject to any disclaimer, the term of this patent is extended or adjusted under 35 U.S.C. 154(b) by 740 days.

(21) Appl. No.: 17/949,586

(22) Filed: Sep. 21, 2022

(65) Prior Publication Data

US 2023/0086183 A1     Mar. 23, 2023

Related U.S. Application Data

(60) Provisional application No. 63/246,499, filed on Sep. 21, 2021.

(51) Int. Cl.
    *G01N 30/72*     (2006.01)
    *G01N 30/86*     (2006.01)
(52) U.S. Cl.
    CPC ..... *G01N 30/7233* (2013.01); *G01N 30/8631* (2013.01); *G01N 30/8644* (2013.01); *G01N 30/8668* (2013.01)
(58) Field of Classification Search
    CPC .......... G01N 30/7233; G01N 30/8631; G01N 30/8644; G01N 30/8668; G01N 30/8686; G01N 2030/125; G01N 30/88
See application file for complete search history.

(56) References Cited

U.S. PATENT DOCUMENTS 11,458,473 B2 * 10/2022 Linder .................. G01N 21/05
2003/0013203 A1 * 1/2003 Jedrzejewski ........ B01L 3/5088
    436/178

(Continued)

OTHER PUBLICATIONS

Gasparini G, et al.. Quantification of Residual Perfume by Py-GC-MS in Fragrance Encapsulate Polymeric Materials Intended for Biodegradation Tests. Molecules. Feb. 7, 2020;25(3):718. doi: 10.3390/molecules25030718. PMID: 32046014; PMCID: PMC (Year: 2020).*

*Primary Examiner* — David A Vanore
(74) *Attorney, Agent, or Firm* — Christopher Feigenbutz; Naval Surface Warfare Center, Crane Division

(57) ABSTRACT

Provided is a method to initiate and analyze chemical derivatives formed from pyrotechnic smoke reactions. Milligram quantities of a lab-scale pyrotechnic smoke composition are reacted by encapsulation with a metal probe that is rapidly heated, which then sublimes the organic dye, allowing for the testing of all of the gas-phase products for identification by pyrolysis-gas chromatography-mass spectrometry. The thermally decomposed ingredients and new side product derivatives are identified at lower relative abundances compared to the intact organic dye. Any remaining residues within the thermal probe are optionally reconstituted into solution for further analysis by liquid chromatography-mass spectrometry if desired. The results are processed via a machine learning quantitative structure-activity relationship model that provides data related to health and environmental hazards.

7 Claims, 5 Drawing Sheets

Solvent Green 3

Solvent Blue 35

Disperse Red 9

Vat Yellow 4

Benzanthrone

(56) References Cited

U.S. PATENT DOCUMENTS

| 2003/0118481 A1* | 6/2003 | Briscoe ............. G01N 30/6095 |
| | | 422/89 |
| 2005/0079634 A1* | 4/2005 | Wilding ........... B01L 3/502707 |
| | | 436/514 |
| 2023/0086183 A1* | 3/2023 | Dilger ............... G01N 30/8686 |
| | | 250/282 |

* cited by examiner

DETECTION AND IDENTIFICATION OF CHEMICAL DERIVATIVES FORMED FROM PYROTECHNIC SMOKE REACTIONS

CROSS-REFERENCE TO RELATED APPLICATIONS

The present application claims priority to U.S. Provisional Patent Application Ser. No. 63/246,499, filed Sep. 21, 2021, entitled "DETECTION AND IDENTIFICATION OF CHEMICAL DERIVATIVES FORMED FROM PYRO-TECHNIC SMOKE REACTIONS," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 210270U502) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to pyrotechnics. More particularly, it pertains to detection and identification of chemical derivatives formed from pyrotechnic smoke reactions.

BACKGROUND

Performance objectives drive pyrotechnic chemical engineering in tailoring quantifiable reaction effects to include temperature, color purity, luminosity, burn rate, or smoke dispersion, often by subtle substitutions or additives to the formulation or surrounding reaction environment. Maximizing performance historically also enlarged chemical exposure risks to ecological or human health. As a result, an impressive compilation of work over the past several decades has sought to reengineer many types of pyrotechnic compositions by replacing hazardous formulation ingredients with "greener", safer alternatives. "Green" pyrotechnics seek to remove known environmental pollutants and health hazards from their formulations. This chemical engineering approach often focuses on maintaining performance effects upon replacement of objectionable ingredients, yet neglects the chemical products formed by the exothermic reaction. The elimination of objectionable pyrotechnic reactants certainly has affected environmental health and sustainment; however, it is argued that the pyrotechnic chemist must also consider the other half of the chemical reaction and appropriately assess all products formed from these new "non-toxic" alternative formulations.

Typically, pyrotechnic chemists focus on modifying the condensed phase constituents, new additives, or otherwise changing the solid form of the reactant. While studying the reaction byproducts of pyrotechnic has gained interest in recent years, there has been little in the way of progress related to the study of detection and identification of chemical derivatives formed from pyrotechnic smoke reactions.

This is partly caused by the limited number of laboratories that can handle and ignite energetic materials. Additionally among the laboratories that have this capability, few perform research and development. As is clear from the foregoing, there is a need for an improved method for the detection and identification of chemical derivatives formed from pyrotechnic smoke reactions

SUMMARY OF THE INVENTION

The present invention relates to a method to initiate and analyze chemical derivatives formed from pyrotechnic smoke reactions. The method comprises providing milligram quantities of a lab-scale pyrotechnic smoke composition and initiating a reaction by encapsulating it with a metal probe that is rapidly heated. The rapid heating initiates a redox reaction from the pyrotechnic sample, which then sublimes the organic dye, allowing for the testing of all of the gas-phase products for identification by pyrolysis-gas chromatography-mass spectrometry. The thermally decomposed ingredients and new side product derivatives are identified at lower relative abundances compared to the intact organic dye. Any remaining residues within the thermal probe are optionally reconstituted into solution for further analysis by liquid chromatography-mass spectrometry (LC-MS), if desired. The results are processed via a machine learning quantitative structure-activity relationship model that provides data related to health and environmental hazards.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
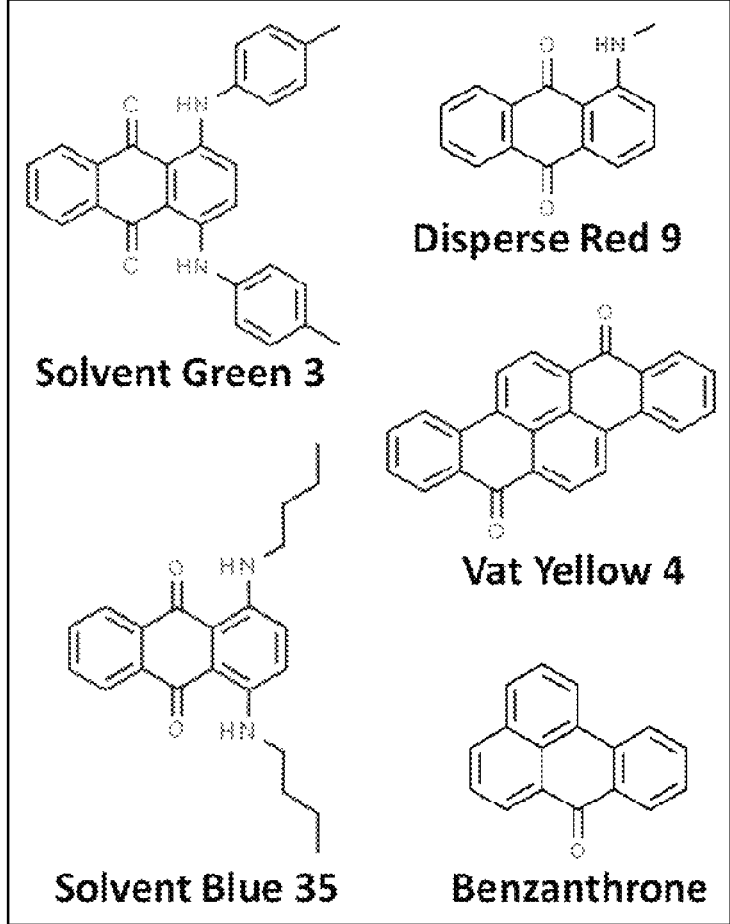
FIG. 1 shows exemplar anthraquinone-based dyes used within smoke-producing pyrotechnics.

The embodiments of the invention described herein are not intended to be exhaustive or to limit the invention to precise forms disclosed. Rather, the embodiments selected for description have been chosen to enable one skilled in the art to practice the invention.

Generally, the present invention provides a method for initiating and analyzing chemical derivatives formed from pyrotechnic smoke reactions. Milligram quantities of a lab-scale pyrotechnic smoke composition are encapsulated and initiated via a metal probe that is rapidly heated. A redox reaction sublimes the organic dye, and all of the gas-phase products are identified by pyrolysis-gas chromatography-mass spectrometry. Thermally decomposed ingredients and side product derivatives are identified at lower relative abundances compared to the intact organic dye. Optionally, remaining residues within the thermal probe are reconstituted for further analysis by LC-MS. A machine learning quantitative structure-activity relationship model is used to provide data related to health and environmental hazards.

In an illustrative embodiment, provided is a method for analyzing one or more chemical products formed from pyrotechnic smoke reactions comprising: encapsulating a quantity of a pyrotechnic smoke composition; pyrolyizing the quantity with a heat source to produce the one or more chemical products; performing pyrolysis-gas chromatography-mass spectrometry of the one or more chemical products; comparing a pyrolysis-gas chromatography-mass spectrometry result of the one or more chemical products to a database of compounds, identifying the one or more chemical products based on the comparison and assigning a confidence score; performing a toxicity and health hazard analysis of the chemical products with a machine learning quantitative structure-activity relationship model; utilizing a hierarchical clustering analysis to predict toxicity; and assigning a score to the one or more chemical products.

In an illustrative embodiment, the encapsulated pyrotechnic smoke composition is initiated via a metal probe that is rapidly heated. In an illustrative embodiment, the pyrolyizing produces a redox reaction that sublimes one or more organic dyes in the composition. In an illustrative embodiment, the one or more chemical products identified by pyrolysis-gas chromatography-mass spectrometry are gas-phase products. In an illustrative embodiment, the one or more chemical products comprise thermally decomposed ingredients and side product derivatives are identified at lower relative abundances compared to the one or more organic dyes. In an illustrative embodiment, remaining residues within the thermal probe are reconstituted for further analysis by liquid chromatography-mass spectrometry. In an illustrative embodiment, the toxicity analysis of the one or more chemical products result comprises a rat inhalation LC50. In an illustrative embodiment, the rat inhalation LC50 analysis further comprises filtering out the one or more chemical products from the results unless they contain carbon, hydrogen, oxygen, nitrogen, fluorine, chlorine, bromine, iodine, sulfur, phosphorus, silicon, arsenic, mercury, or tin. In an illustrative embodiment, a broad primary peak obtained from the pyrolysis-gas chromatography-mass spectrometry result is compared to a database and identified as a primary dye molecule. In an illustrative embodiment, the hierarchical clustering analysis predicts toxicity from a series of multilinear regression models, wherein a predicted value for the one or more chemical products is a weighted average of model predictions from a closest cluster from each step in the hierarchical clustering. In an illustrative embodiment, the multilinear regression models undergo a model ellipsoid constraint, an Rmax constraint, and a fragment constraint prior to use in the hierarchical clustering analysis. In an illustrative embodiment, the ellipsoid constraint, checks if the one or more chemical products is within a multidimensional ellipsoid defined by ranges of descriptor values for the one or more chemical products in the cluster. In an illustrative embodiment, the Rmax constraint checks if a distance from the one or more chemical products to a centroid of the cluster is less than a maximum distance for any the one or more chemical products in the cluster to the cluster centroid. In an illustrative embodiment, the fragment constraint, stipulates that the one or more chemical products in the cluster must contain at least one example of each fragment present in the one or more chemical products. In an illustrative embodiment, the score is assigned by a hazard comparison dashboard that compares the one or more chemical products in terms of human health, ecotoxicity, and fate using data from databases comprising hazardous chemical lists, the toxicity and health hazard analysis, and the hierarchical clustering analysis and assigns scoring categories of low, medium, high, or very high.

In an illustrative embodiment, provided is a method for analyzing one or more chemical products formed from pyrotechnic smoke reactions comprising: encapsulating a quantity of a pyrotechnic smoke composition; pyrolyizing the quantity with a heat source to produce the one or more chemical products; performing pyrolysis-gas chromatography-mass spectrometry of the one or more chemical products; comparing a pyrolysis-gas chromatography-mass spectrometry result of the one or more chemical products to a database of compounds, identifying the one or more chemical products based on the comparison and assigning a confidence score; performing a toxicity and health hazard analysis of the chemical products with a machine learning quantitative structure-activity relationship model; utilizing a hierarchical clustering analysis to predict toxicity, wherein the hierarchical clustering analysis predicts toxicity from a series of multilinear regression models, wherein a predicted value for the one or more chemical products is a weighted average of model predictions from a closest cluster from each step in the hierarchical clustering; wherein the multilinear regression models undergo a model ellipsoid constraint, an Rmax constraint, and a fragment constraint prior to use in the hierarchical clustering analysis; wherein the ellipsoid constraint, checks if the one or more chemical products is within a multidimensional ellipsoid defined by ranges of descriptor values for the one or more chemical products in the cluster; wherein the Rmax constraint checks if a distance from the one or more chemical products to a centroid of the cluster is less than a maximum distance for any the one or more chemical products in the cluster to the cluster centroid; wherein the fragment constraint, stipulates that the one or more chemical products in the cluster must contain at least one example of each fragment present in the one or more chemical products; and assigning a score to the one or more chemical products, wherein the score is assigned by a hazard comparison dashboard that compares the one or more chemical products in terms of human health, ecotoxicity, and fate using data from databases comprising hazardous chemical lists, the toxicity and health hazard analysis, and the hierarchical clustering analysis and assigns scoring categories of low, medium, high, or very high.

In an illustrative embodiment, provided is a method for analyzing one or more chemical products formed from pyrotechnic smoke reactions comprising: pyrolyizing a quantity of pyrotechnic smoke reactants with a heat source to produce the one or more chemical products; performing pyrolysis-gas chromatography-mass spectrometry of the one or more chemical products; comparing a pyrolysis-gas chromatography-mass spectrometry result to a database of compounds, identifying the one or more chemical products based on the comparison and assigning a confidence score; performing a toxicity and health hazard analysis of the chemical products with a machine learning quantitative structure-activity relationship model; utilizing a hierarchical clustering analysis to predict toxicity; and assigning a score to the one or more chemical products.

Colored smoke-producing formulations are designed to function at temperatures that are relatively low for typical pyrotechnic reactions. Smoke formulations operate by reacting a carbohydrate (typically a starch or disaccharide like lactose or sucrose) with a heated oxidizer (typically potassium chlorate) just below the oxidizer melting point. In such a manner, a reaction temperature is sustained that is high enough to eclipse the relatively low boiling point of an organic dye to sublimate from a solid into the gas-phase. Dyes must offer sufficient thermal stability to mitigate molecular decomposition and maintain color purity. The method will be better understood with the following example.

EXAMPLE

FIG. 1 highlights the anthraquinone-based dye structures most often relied upon within colored smoke pyrotechnic formulations. The organic dye will likely hold the greatest toxicological influence of all the ingredients within a typical pyrotechnic smoke composition due to their constituent presence as polycyclic aromatic hydrocarbons. The anthraquinone base molecule is a non-toxic, naturally occurring plant metabolite with derivative compounds that range in utility from medicines to pesticides, although strong concerns exist regarding toxicity and carcinogenicity of certain derivations with phenolic or amino groups. In some cases, the parent molecule is non-toxic but is readily reduced and cleaved by microflora metabolism to form highly toxic aromatic amines. Thus, toxicity predictions should consider the base dye molecule alongside empirically determined breakdown products and functionalized derivations for an accurate assessment to health.

Table 1 presents the respective weight percentage for, potassium chlorate, and disperse red 9, or 1-(methylamino) anthraquinone ingredients for a mock red flare (MRF) composition. To prepare a 5.0 g batch of MRF, each ingredient was massed individually using an analytical balance and then dried overnight at 70° C. The full composition was then hand-mixed using a metal spatula in a ceramic mortar for approximately 20 minutes until homogenous and returned to the 70° C. drying oven until analysis.

TABLE 1

| MRF pyrotechnic formulation. | | |
| --- | --- | --- |
| Ingredient | Formula | wt. (%) |
| disperse red 9 | $C_{15}H_{11}NO_2$ | 27.17 |
| sucrose | $C_{12}H_{22}O_{11}$ | 39.70 |
| potassium chlorate | $KClO_3$ | 33.13 |

Simultaneous Thermal Analysis (STA). MRF ignition temperature was determined with a Mettler Toledo TGA/DSC 2 (STA) instrument. The STA simultaneously performs differential scanning calorimetry (DSC) and thermogravimetric analysis (TGA) in a single run. Approximately 2.0 mg samples of MRF composition, sucrose, potassium chlorate, and disperse red 9 were each analyzed by STA using individual 70-μL aluminum oxide crucibles. A temperature ramp from 30° C. to 800° C. heated the sample at a rate of 2° C. min$^{-1}$ under high purity $N_2$, delivered from a Peak-Scientific XE35 nitrogen generator at 20 mL min$^1$.

Pyrolysis. An Agilent thermal separation probe pyrolyzed samples. A quartz tube plugged on both ends with quartz wool held samples of approximately 0.1-1.0 mg for placement into a stainless steel probe. The sample-containing probe then was inserted into the heated inlet, purged with helium, set to a fixed temperature (0-450° C.), and held within the inlet for a minimum of 10 sec before injection of the gaseous byproducts into a GC/MS for separation and analysis.

Gas Chromatography-Mass Spectrometry. The pyrolyzed samples were passed into an Agilent 7890B GC System via a helium carrier gas into a HP-5 ms UI, 30 m, 0.25 mm, 0.25 μm column. The GC oven profile began at 40° C. for 1 min at the start of the method, followed by successive temperature ramps of 15° C.·min$^{-1}$ for 4 min and 10° C.·min$^{-1}$ for 11 min. The oven temperature was then held at 210° C. for 1 min prior to a temperature ramp of 5° C.·min$^{-1}$ for 20 min. A final temperature of 310° C. was held for 8 min to conclude the 45-minute gas chromatography separation. A 1:10 split injection mode was used at a carrier-gas flow rate of 0.7 mL-min$^{-1}$. The GC eluted into a 5877B MS detector set at 230° C. with an EI source set at 70 eV. Scanning the RF fields of the single quadrupole ejected masses selectively from 50 to 500 amu.

The Agilent MassHunter data-acquisition software suite compiled nested GC/MS data and extracted MS slice integrations across an eluted GC peak with subtracted background noise. Queries against the NIST/EPA/NIH Mass Spectral Library (NIST 17) matched well-characterized compounds against an empirically derived mass spectrum if the search algorithm exceeded a score of 50. OriginPro 2015 generated all graphical plots.

Toxicity modelling. Models were developed to predict rat inhalation $LC_{50}$ (the concentration in mg·L$^{-1}$ that kills half of rats by inhalation in 4 hours). Rat inhalation $LC_{50}$ data was normalized to 4 hr test durations. Compounds were filtered from the dataset unless they contained carbon, hydrogen, oxygen, nitrogen, fluorine, chlorine, bromine, iodine, sulfur, phosphorus, silicon, arsenic, mercury, or tin. Salts, polymers, and compounds with incompletely defined structures also were removed to yield a final dataset containing 744 compounds. Toxicity values were converted to $-\log_{10}$ ($LC_{50}$ mol·L$_{5-1}$) and split randomly into a training set (80%) and a prediction set (20%) to fit and train the model, respectively.

Figure 2:
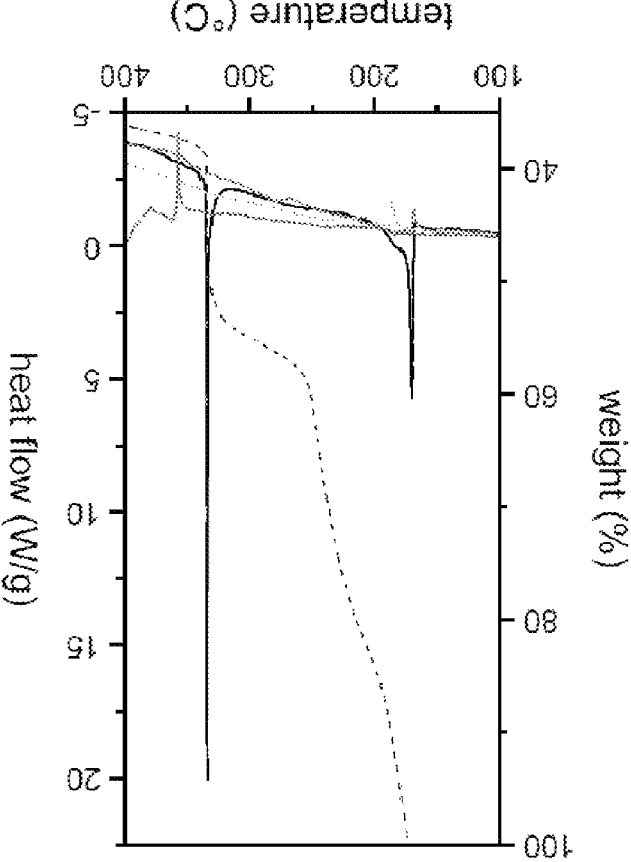
FIG. 2 shows STA data for MRF, disperse red 9, sucrose, and potassium chlorate.

Thermal Analysis via STA. FIG. 2 shows the DSC and TGA data for the MRF and its separate ingredients. The MRF shows two major exotherms at onset temperatures of 168.4° C. and 332.5° C. The first MRF exotherm (Tonset=168.4° C.) coincides with the known melting points of disperse red 9 (172° C.) and sucrose (186° C.). While it is known that these melting processes are endothermic, the massive weight loss measured at the same onset temperature suggests initiation of the pyrotechnic reaction of the three-part mixture that results in a net exothermic heat flow.

After the primary exotherm, a steady loss of MRF mass of ~51% occurs that coincides with gaseous evolution from the sublimation of the disperse red 9 dye and burning of residual sucrose. The second primary exotherm of the MRF (Tonset=332° C.) coincides with the melting point of the potassium chlorate oxidizer (356° C.) and a final mass loss of ~17%. Once again, the net exothermic heat flow of the three-part mixture overwhelms the endothermic phase change of the oxidizer, suggesting that this is the final major step in the completion of the pyrotechnic reaction. From this data, it is clear that the pyrotechnic reaction proceeds as a multistep, exothermic process driven by phase changes in the sucrose fuel and potassium chlorate oxidizer. Thus, pyrolysis conditions are required to meet or exceed the onset temperature of 200° C. to initiate the reaction, and 325° C. to simulate a full combustion reaction of the smoke composition.

GC-MS Measurements of MRF Pyrolysis. Experimental design included a range of thermal probe temperatures up to 350° C. to analyze MRF pyrolysis. A dwell time of 10 seconds within the thermal probe was determined to reproduce reaction initiation. Two different MRF sample sizes of ~0.2 mg and ~1.0 mg were analyzed to maximize chromatographic separation or ion abundance, respectively.

Figure 3:
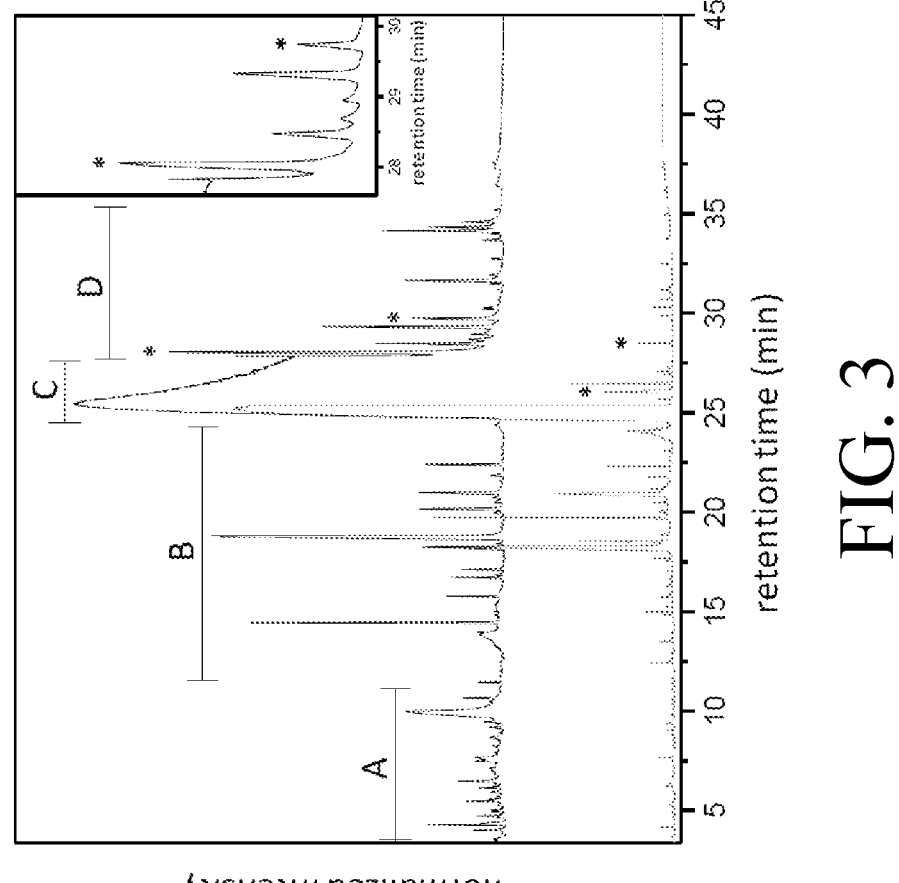
FIG. 3 shows a gas chromatogram of the heated inlet pyrolysis of the MRF sample.

FIG. 3 displays the gas chromatography separation following the 10-second pyrolysis at a thermal probe temperature of 350° C. for the ~0.2 mg and ~1.0 mg MRF samples. A peak identified as the disperse red 9 dye dominates each chromatogram at a maximum retention time of ~25.4 minutes. Pyrolysis of the lower mass MRF sample yields a gas-phase separation with improved chromatographic peak resolution and fewer peaks above the signal-to-noise. Inversely, pyrolysis of the higher mass MRF sample offers many more minor peaks with larger integrated ion counts that produced high-confidence molecular assignments. Peaks that elute before the disperse red 9 dye all have parent ions of lower mass that were identified as primary thermal degradation products of the originated ingredients. Conversely, peaks that elute after the dye have higher mass parent ions with similar fragmentation patterns to that observed from the disperse red 9 dye. Presumably, these peaks result from available functional groups within the environment at the pyrotechnic reaction origin that chemically modifies the dye.

Assignments of the MRF Pyrolysis Products. The broad primary peak is unequivocally assigned as disperse red 9 with a gas-phase abundance that is congruent with the intended engineering of the pyrotechnic reaction. It is possible that other peaks are unresolved underneath this expansive peak, although the mass spectrum at each retention time display no evidence of other overlapping compounds. Similarly, the smaller mass MRF sample does not show additional resolved peaks that are unassigned or unobserved from pyrolysis of the larger mass MRF sample.

Figure 4:
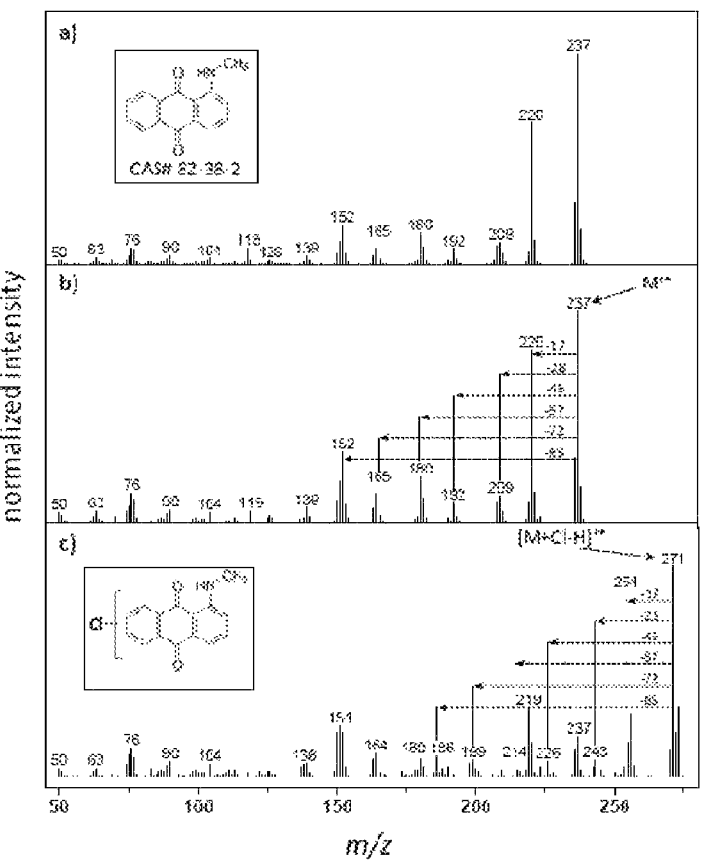
FIG. 4 shows an EI mass spectrum of disperse red 9.

FIG. 4 displays the NIST database mass spectrum and integrated mass spectrum for the primary peak identified as disperse red 9. Overall, the two mass spectra are highly comparable in 1) the observation of m/z 237 as the base-peak parent ion ($M^{+•}$), 2) the presence of each characteristic fragment ion at specific m/z, and 3) the relative abundances of the fragments within the distribution. All of these similarities led to a high confidence score of 96% from the NIST Library for this specific assignment.

Chlorinated disperse red 9 is not present within the NIST Library, but can be forensically assigned by hand as shown in FIG. 4C. The presence of chlorine in the parent ion is assigned with diagnostic 3:1 peak heights for the m:m+2 isotopic ratio for the base peak at m/z 271.1 and primary fragment ion at m/z 254.1. A distinct pattern is shown for major fragmentation peaks with neutral losses of 17, 28, 45, 57, 72, and 85 Da; a pattern that is also prominent in the electron impact fragmentation of disperse red 9. Similarly, $M^{+•}$ itself is observed as a primary fragment ion corresponding to a 34 Da neutral mass loss that is assigned as the addition of $Cl^{35}$ substituted in the place of a hydrogen. Many other fragment ions are recorded that are either equivalent in mass to those seen in the fragmentation spectrum of the dye, or are mass shifted by 1 Da due to the hydrogen substitution upon chlorination. Finally, another fragment ion is noted at m/z 219 (neutral loss of 52 Da) that is speculated to result from the neutral loss of hypochloric acid, an assignment bolstered by the absence of the characteristic $Cl^{35}:Cl^{37}$ isotopic ratio.

Summary of the Pyrolyzed MRF Combustion Products. Table 2 lists all identified products with chemical formula, mass, and specific retention times from 350° C. pyrolysis of the 1.0 mg MRF sample. Thirty unique compounds from the pyrolysate are identified following the 170 reaction of the simple three-part pyrotechnic smoke composition. It is important to note that assignments are made for structural classes of molecules that correlate in a general sense to the pyrolysis products, as stereochemistry or regioisomers cannot be reliably discriminated using only this GC/MS approach.

TABLE 2

| Retention Time (min) | Compound | Formula | Mass (Da) |
|---|---|---|---|
| | MRF pyrotechnic reaction pyrolysis products at 350° C. for 10 seconds. | | |
| 4.30 | furfural | $C_5H_4O_2$ | 96.1 |
| 4.74 | xylene | $C_8H_{10}$ | 106.1 |
| 4.83 | phenylacetylene | $C_8H_6$ | 102.1 |
| 5.03 | styrene | $C_8H_8$ | 104.1 |
| 5.49 | furanone | $C_6H_4O_2$ | 84.1 |
| 6.15 | phenol[a] | $C_6H_6O$ | 94.1 |
| 6.49 | pyrandione | $C_5H_5O_3$ | 112.1 |
| 7.48 | furandicarboxylaldehyde | $C_6H_4O_3$ | 124.1 |
| 9.46 | (acetoxymethyl)furaldehyde | $C_8H_8O_4$ | 168.2 |
| 9.97 | hydroxymethylfurfural | $C_6H_6O_3$ | 126.1 |
| 10.67 | phthalic acid | $C_8H_6O_4$ | 166.1 |
| 11.44 | biphenyl | $C_{12}H_{10}$ | 154.2 |
| 12.46 | acenaphthylene[a] | $C_{12}H_8$ | 152.2 |
| 12.95 | isocyanonephthalene | $C_{11}H_7N$ | 153.2 |
| 13.19 | dibenzofuran | $C_{12}H_8O$ | 168.2 |
| 13.97 | fluorene[a] | $C_{13}H_{10}$ | 166.2 |
| 14.45 | azobenzene | $C_{12}H_{10}N_2$ | 182.1 |
| 15.77 | fluorenone | $C_{13}H_8O$ | 180.1 |
| 16.73 | aminofluorene | $C_{13}H_{11}N$ | 181.2 |
| 17.12 | (biphenyl)ylformamide | $C_{13}H_{11}NO$ | 197.2 |
| 18.24 | palmitic acid | $C_{16}H_{32}O_2$ | 256.4 |
| 18.81 | anthraquinone | $C_{14}H_8O_2$ | 208.1 |
| 19.97 | methylanthraquinone | $C_{15}H_{10}O_2$ | 222.2 |
| 20.17 | hydroxyanthraquinone | $C_{14}H_8O_3$ | 224.1 |
| 20.99 | stearic acid | $C_{18}H_{36}O_2$ | 284.5 |
| 22.40 | aminoanthraquinone | $C_{14}H_9NO_2$ | 223.1 |
| 25.48 | (methylamino)anthraquinone | $C_{15}H_{11}NO_2$ | 237.1 |
| 28.06, 29.74 | chloro(methylamino)anthraquinone | $C_{15}H_{10}ClNO_2$ | 271.1 |
| 28.48 | (formamidyl)anthraquinone | $C_{15}H_9NO_3$ | 251.2 |
| 29.33 | (phenyl)anthraquinone | $C_{20}H_{12}O_2$ | 284.3 |
| 31.64 | bis(methylamino)anthraquinone | $C_{16}H_{14}N_2O_2$ | 266.3 |

[a]Compound regulated as an EPA Priority Pollutant
[b]Compound identified as additive within sucrose ingredient.

Eleven of these compounds elute off the column in the first eleven minutes and are all identified as thermal decomposition products from sucrose. All contain only a combination of carbon, hydrogen, and oxygen. Among these products is furfural, which is a well-known dehydration product from the burning of sucrose. The next fifteen compounds mostly consist of breakdown products of the dye, with the exception of palmitic acid and stearic acid that are found commonly as non-natural surfactant additives in the synthesis of sucrose. Benzene, naphthalene, fluorene, or anthraquinone scaffolds formed the basis of the other thirteen compounds. Several of these compounds now incorporate nitrogen, which can only be present directly from the dye. Notable among these assignments are the observation of methylated, hydroxylated, and aminated variants of the anthraquinone base structure.

Only five of the pyrolysate peaks that eluted after the dye were identified with a high confidence of assignment, identified as four compounds of formamidyl-, phenyl-, bis(methylamino)-, and chloromethylamino- derivatives of the anthraquinone base structure. While the other peaks in this region of the chromatogram cannot be indisputably assigned, it is clear from their integrated mass spectra that they are generally higher mass derivatives of the dye. This interpretation is bolstered with the presence of many of the same diagnostic fragment ions of disperse red 9 that are equivalent or mass-shifted by 1 Da. For example, there exists a chromatogram peak at 28.48 min, where the integrated mass spectrum displays a parent ion at m/z 253.1 alongside fragment ions at m/z 236.1, 220.1, 180.1, 152.1, 139.1, 127.1, 105.1, 77.1, 63.1, and 51.1 at similar abundances as observed within the dye mass spectrum (data not shown). Other unique fragment ions also are observed that are likely diagnostic of the derivative location onto the dye. This derivation is likely via addition of an oxygen onto the dye structure, probably donated by the chlorate oxidizer. However, the NIST library did not return a high confidence score to assign it as such. In such a case, a higher resolving power mass spectrometer would be required to differentiate the mass of oxygen from other combinations of carbon, hydrogen, and nitrogen of similar mass to produce a high confidence assignment.

Three of the MRF pyrolysis products (phenol, fluorene, and acenaphthylene) are regulated under the Clean Water Act as toxic Priority Pollutants. The most striking derivative identified was the chlorinated disperse red 9, a noteworthy observation when considering that over half of all Priority Pollutants compounds are chlorinated (including many polycyclic aromatic compounds). Here, two separate peaks are assigned with differences in the mass fragmentation patterns that is probably reflective of unique chlorination 205 sites onto the dye structure. This compound was identified only from MRF pyrolysis at thermal probe temperatures at or above 200° C., whereas it was absent in a 200° C. pyrolysis control experiment of a complementary two-part mixture containing the potassium chlorate oxidizer and dye. Given this result, it is interpreted that the pyrotechnic reaction between the sucrose fuel and potassium chlorate oxidizer must catalyze such halogenated derivations of the dye.

Prediction of Acute Mammalian Inhalation Toxicity. Toxicology data is most prevalent for smaller organic molecules (similar to the observed ingredient decomposition products), but is still lacking for most pyrotechnic dyes and its derivative side products. Additionally, there a rich history of advanced statistical analyses to predict structure and chemical activity from the constituents of chemical compounds. Here, a hierarchical clustering method was employed to model acute mammalian inhalation toxicity for a subset of anthraquinone dyes that are used commonly in military pyrotechnic smoke formulations. It is noted that the unique dye colors are largely defined by derivations to the anthraquinone dye backbone, typically with organic side groups that may or may not include oxygen- or nitrogen-containing functional groups.

The hierarchical clustering method predicts toxicity from a series of multilinear regression models, where the predicted value for a given test chemical is the weighted average of the model predictions from the closest cluster from each step in the hierarchical clustering. The advantage of this approach is that it can correlate diverse data sets without having to develop separate models for specific chemical classes, such as dye compounds. The dependent variables are molecular descriptors calculated using the Toxicity Estimation Software Tool (T.E.S.T.). Before any cluster model can be used to make a prediction for a test chemical, it must be determined whether the test chemical falls within the applicability domain for the model. The first constraint, the model ellipsoid constraint, checks if the test chemical is within the multidimensional ellipsoid defined by the ranges of descriptor values for the chemicals in the cluster (for the descriptors appearing the cluster model). The second constraint, the Rmax constraint, checks if the distance from the test chemical to the centroid of the cluster is less than the maximum distance for any chemical in the cluster to the cluster centroid. The final constraint, the fragment constraint, stipulates the chemicals in the cluster must contain at least one example of each of the fragments that are present in the test chemical. The fragment constraint was not applied to the dye molecules since it was desired to obtain a prediction for nearly all the dye molecules.

Figure 5:
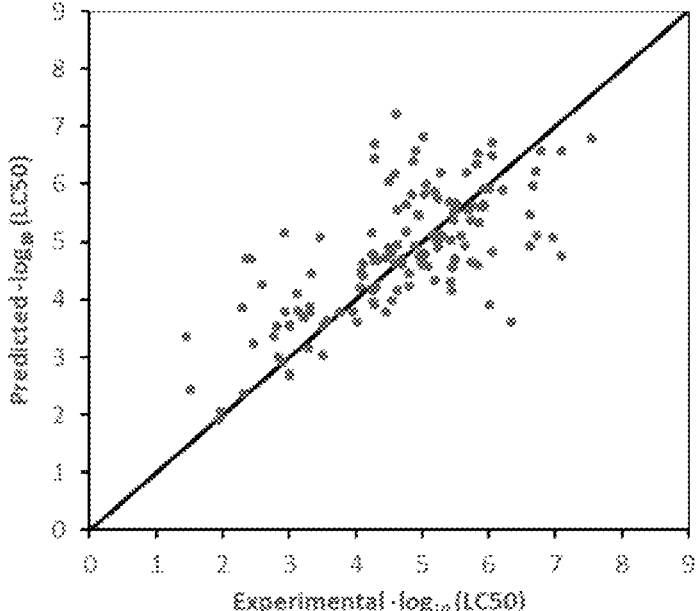
FIG. 5 shows a graph of predicting acute inhalation toxicity using a hierarchical clustering method.

FIG. 5 displays the prediction results for the validation set. For the external prediction set of 152 compounds, the hierarchical clustering method achieved an $r^2$ correlation coefficient of 0.48 and a prediction coverage (fraction of chemicals inside the applicability domain) of 0.90. These results are comparable to those obtained for acute oral toxicity, which is difficult to correlate due to a high degree of experimental variability. In general, the dyes are predicted to be very highly toxic ($LC_{50}$<mol·L–1) with Solvent Violet 13 predicted to be the most toxic upon in halation. On average, the chlorinated versions of each dye were slightly more toxic by 0.22 log units, corresponding to an average decrease in $LC_{50}$ by 0.42 mg·L$^{-1}$. These are especially alarming predictions, considering the significant exposure risk of inhalation to a user when deploying signaling or obscurant smoke pyrotechnics during operational or training exercises.

Hazard Comparison Dashboard. The HCD compares chemicals in terms of human health (acute mammalian toxicity, carcinogenicity, mutagenicity, endocrine disruption, reproductive toxicity, developmental toxicity, neurotoxicity, systemic toxicity, skin sensitization, skin irritation, eye irritation), ecotoxicity (acute aquatic toxicity and chronic aquatic toxicity), and fate (persistence and bioaccumulation). The HCD assigns scoring categories of low, medium, high, or very high using data from a variety of sources to include hazardous chemical lists, experimental data, and predicted data using one or more models. For example scores for acute mammalian inhalation toxicity can be assigned from experimental $LC_{50}$ values in mg·L$^{-1}$ as follows: $LC_{50}$≤2 (very high or VH), 2<$LC_{50}$≤10 (high or H), 10<$LC_{50}$≤20 (medium or M), and $LC_{50}$>20 (low or L). Alternatively, scores also can be assigned from GHS (Globally Harmonized System) classification codes as follows: H330 (very high), H331 (high), and H332 (medium). Inconclusive (I) scores indicate scores which can't be assigned. Blank scores indicate there is no data or prediction for a given hazard.

Columns for neurotoxicity and single dose systemic toxicity were omitted due to lack of data. Most of the dye compounds and chlorinated derivatives possessed high or very acute mammalian inhalation toxicity (values taken from the hierarchical clustering predictions). Most of the compounds here show high to very high evidence of being mutagenic, including the disperse red 9 dye studied above. Nearly every single dye and all of the chlorinated derivatives are predicted with a high developmental health hazard, and exactly half are predicted with a high risk of endocrine disruption. Repeat exposure systemic toxicity tests evaluate the generalized biological effects to organs and tissues following repeated exposure to a chemical. Only Solvent Green 3 shows a moderate score for systemic toxicity repeat exposure, based on chronic experimental toxicity data. Solvent Blue 36 is categorized as a potential skin and eye irritant, which may be an important for direct surface exposure to military personnel.

The chlorination of the anthraquinone dyes studied here also shows several predictions relevant to health and ecology. Chlorination of the anthraquinone dyes is predicted to have a negative effect on acute aquatic toxicity, as the dyes generally increase from a high to very high hazard category. The model also predicts an improvement in bioaccumulation hazards as all dyes categorized as a high hazard score decrease to a medium or low score. Finally, the model for carcinogenicity, reproductive health, chronic aquatic toxicity, and persistence could not calculate scores for the chlorinated dyes due to a lack of representative data.

Although the invention has been described in detail with reference to certain preferred embodiments, variations and modifications exist within the spirit and scope of the invention as described and defined in the following claims.

The invention claimed is:

1. A method for analyzing one or more chemical products formed from pyrotechnic smoke reactions comprising:

encapsulating a quantity of a pyrotechnic smoke composition;

pyrolyizing said quantity with a heat source to produce said one or more chemical products;

performing pyrolysis-gas chromatography-mass spectrometry of said one or more chemical products and identifying a primary peak from said one or more chemical products;

identifying a primary dye molecule from said primary peak;

performing a rat inhalation $LC_{50}$ analysis by determining a concentration in mg·$L^{-1}$ of said primary dye molecule that kills half of rats by inhalation in 4 hours.

2. The method of claim 1, wherein said encapsulated pyrotechnic smoke composition is initiated via a metal probe that is rapidly heated.

3. The method of claim 1, wherein pyrolyizing produces a redox reaction that sublimes one or more organic dyes in said composition.

4. The method of claim 3, wherein said one or more chemical products identified by pyrolysis-gas chromatography-mass spectrometry are gas-phase products.

5. The method of claim 4, wherein said one or more chemical products comprise thermally decomposed ingredients and side product derivatives are identified at lower relative abundances compared to the said one or more organic dyes.

6. The method of claim 1, wherein, remaining residues within said thermal probe are reconstituted for further analysis by liquid chromatography-mass spectrometry.

7. The method of claim 1, wherein said rat inhalation $LC_{50}$ analysis further comprises, the step of assigning a score of very high if $LC_{50} \leq 2$, a score of high if $2 < LC_{50} \leq 10$, a score of medium if $10 < LC_{50} \leq 20$, and a score of low if $LC_{50} > 20$.

* * * * *